US011395190B2

(12) United States Patent
Ozturk et al.

(10) Patent No.: US 11,395,190 B2
(45) Date of Patent: Jul. 19, 2022

(54) FULL CONFIGURATION HANDOVER TECHNIQUES

(71) Applicant: QUALCOMM Incorporated, San Diego, CA (US)

(72) Inventors: Ozcan Ozturk, San Diego, CA (US); Karthika Paladugu, San Diego, CA (US); Masato Kitazoe, Tokyo (JP); Xipeng Zhu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 30 days.

(21) Appl. No.: 16/999,008

(22) Filed: Aug. 20, 2020

(65) Prior Publication Data

US 2021/0058829 A1 Feb. 25, 2021

Related U.S. Application Data

(60) Provisional application No. 62/891,182, filed on Aug. 23, 2019.

(51) Int. Cl.
*H04W 36/00* (2009.01)
*H04L 41/0803* (2022.01)
*H04W 36/08* (2009.01)
*H04W 12/0433* (2021.01)

(52) U.S. Cl.
CPC ..... *H04W 36/0011* (2013.01); *H04L 41/0803* (2013.01); *H04W 12/0433* (2021.01); *H04W 36/08* (2013.01)

(58) Field of Classification Search
None
See application file for complete search history.

(56) References Cited

U.S. PATENT DOCUMENTS

2013/0267232 A1* 10/2013 Alam .............. H04W 36/00835
455/437
2017/0295524 A1* 10/2017 Malkamaki ....... H04W 36/0055
(Continued)

FOREIGN PATENT DOCUMENTS

WO WO-2015171040 A1 11/2015

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 15)", 3GPP Standard; Technical Specification; 3GPP TS 37.340, 3rd Generation Partnership Project (3GPP), Mobile Competence Centre; 650, Route Des Lucioles; F-06921 Sophia-Antipolis Cedex; France, vol. RAN WG2, No. V15.6.0, Jun. 28, 2019 (Jun. 28, 2019), pp. 1-69, XP051754444, [retrieved on Jun. 28, 2019], paragraph [10.2].

(Continued)

*Primary Examiner* — Kenny S Lin
(74) *Attorney, Agent, or Firm* — Qualcomm /Norton Rose Fulbright US LLP

(57) ABSTRACT

Various aspects and techniques for facilitating handovers in communication networks are disclosed. In a particular implementation, a method of wireless communication includes transmitting, from a first base station to a second base station, a handover request message corresponding to a user equipment (UE) associated with the first base station. The handover request message includes a request for full configuration. The method further includes receiving, from the second base station, a handover response message. The handover response message includes an indicator of acceptance of the full configuration. Other aspects and features are also claimed and described.

30 Claims, 7 Drawing Sheets

(56) References Cited

U.S. PATENT DOCUMENTS

| | | | |
|---|---|---|---|
| 2018/0115933 A1 | 4/2018 | Radulescu et al. | |
| 2019/0223057 A1* | 7/2019 | Park | H04W 36/08 |
| 2019/0230569 A1* | 7/2019 | Kim | H04W 88/08 |
| 2019/0306761 A1* | 10/2019 | Jin | H04W 80/10 |
| 2019/0380067 A1* | 12/2019 | Rosa | H04W 36/0072 |
| 2019/0380081 A1* | 12/2019 | Chang | H04W 36/0072 |
| 2019/0387438 A1* | 12/2019 | Chang | H04W 36/36 |
| 2020/0045590 A1* | 2/2020 | Wu | H04W 8/08 |
| 2020/0045594 A1* | 2/2020 | Peng | H04W 36/0016 |
| 2020/0053601 A1* | 2/2020 | Wu | H04W 36/0055 |
| 2020/0336957 A1* | 10/2020 | Wu | H04W 36/08 |
| 2021/0051524 A1* | 2/2021 | Jung | H04W 36/00835 |
| 2021/0051534 A1* | 2/2021 | Xu | H04W 36/08 |

OTHER PUBLICATIONS

"3rd Generation Partnership Project; Technical Specification Group Radio Access Network; Evolved Universal Terrestrial Radio Access Network (E-UTRAN); X2 application protocol (X2AP) (Release 15)", 3GPP Standard; Technical Specification; 3GPP TS 36.423, 3rd Generation Partnership Project (3GPP), Mobile Competence Centre; 650, Route Des Lucioles, F-06921 Sophia-Antipolis Cedex, France, vol. RAN WG3, No. V15.6.0, Jul. 16, 2019 (Jul. 16, 2019), pp. 1-421, XP051754704, Retrieved from the Internet: URL: ftp://ftp.3gpp.org/Specs/latest/Rel-15/36_series/36423-f60.zip 36423-f60.doc, [retrieved on Jul. 16, 2019], paragraph [9.1.1.1].

International Search Report and Written Opinion—PCT/US2020/047447—ISA/EPO—dated Nov. 19, 2020 (194725WO).

Nokia, et al, "Support for Delta Signalling in Case of SN Change", 3GPP Draft, 3GPP TSG-RAN WG3 meeting #97-bis, R3-173502 MR-DC_DELTASIG_TP37340, 3rd Generation Partnership Project (3GPP), Mobile Competence Centre; 650, Route Des Lucioles; F-06921 Sophia-Antipolis Cedex; France, vol. RAN WG3, No. Prague, Czechia, EU; Oct. 9, 2017-Oct. 13, 2017, Sep. 28, 2017 (Sep. 28, 2017), XP051356252, 8 Pages, Retrieved from the Internet: URL: http://www.3gpp.org/ftp/tsg_ran/WG3_lu/TSGR3_97bis/Docs/, [retrieved on Sep. 28, 2017], the whole document.

* cited by examiner

FULL CONFIGURATION HANDOVER TECHNIQUES

CROSS-REFERENCE TO RELATED APPLICATIONS

This application claims the benefit of U.S. Provisional Patent Application No. 62/891,182, filed on Aug. 23, 2019, which is expressly incorporated by reference herein in its entirety as if fully set forth below and for all applicable purposes.

TECHNICAL FIELD

Aspects of the present disclosure relate generally to wireless communication systems, and more particularly, to communications between user equipments (UEs) and base stations. Certain embodiments of the technology discussed below can enable and provide handover techniques to facility mobility, user experience, and communication between devices (e.g., UEs and one or more base stations). Disclosed handover techniques may be used for conditional and/or non-conditional handover scenarios.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is disclosed. The method includes transmitting, from a first base station to a second base station, a handover request message corresponding to a user equipment (UE) associated with the first base station. The handover request message includes a request for full configuration. The method further includes receiving, from the second base station, a handover response message. The handover response message includes an indicator of acceptance of the full configuration.

In an additional aspect of the disclosure, an apparatus configured for wireless communication is disclosed. The apparatus includes at least one processor, and a memory coupled to the processor. The processor is configured to initiate transmission, from a first base station to a second base station, of a handover request message corresponding to a user equipment (UE) associated with the first base station. The handover request message includes a request for full configuration. The at least one processor is further configured to receive, from the second base station, a handover response message. The handover response message includes an indicator of acceptance of the full configuration.

In an additional aspect of the disclosure, an apparatus configured for wireless communication is disclosed. The apparatus includes means for transmitting, from a first base station to a second base station, a handover request message corresponding to a user equipment (UE) associated with the first base station. The handover request message indicates a request for full configuration. The apparatus further includes means for receiving, from the second base station, a handover response message. The handover response message includes an indicator of acceptance of the full configuration.

In an additional aspect of the disclosure, a non-transitory computer-readable medium storing instructions that, when executed by a processor, cause the processor to perform operations is disclosed. The operations include initiating transmission, from a first base station to a second base station, of a handover request message corresponding to a user equipment (UE) associated with the first base station. The handover request message includes a request for full configuration. The operations further include receiving, from the second base station, a handover response message. The handover response message includes an indicator of acceptance of the full configuration.

In an additional aspect of the disclosure, a method of wireless communication is disclosed. The method includes transmitting, from a first base station to a second base station, a secondary node (SN) addition request message corresponding to a user equipment (UE) associated with the first base station. The SN addition request message includes a request for full configuration. The method further includes receiving, from the second base station, a SN addition response message. The SN addition response message includes an indicator of acceptance of the full configuration.

In an additional aspect of the disclosure, an apparatus configured for wireless communication is disclosed. The apparatus includes at least one processor, and a memory coupled to the processor. The processor is configured to initiate transmission, from a first base station to a second base station, of a secondary node (SN) addition request message corresponding to a user equipment (UE) associated with the first base station. The SN addition request message includes a request for full configuration. The at least one processor is further configured to receive, from the second base station, a SN addition response message. The SN addition response message includes an indicator of acceptance of the full configuration.

In an additional aspect of the disclosure, an apparatus configured for wireless communication is disclosed. The apparatus includes means for transmitting, from a first base station to a second base station, a secondary node (SN) addition request message corresponding to a user equipment (UE) associated with the first base station. The SN addition request message indicates a request for full configuration. The apparatus further includes means for receiving, from the second base station, a SN addition response message. The SN addition response message includes an indicator of acceptance of the full configuration.

In an additional aspect of the disclosure, a non-transitory computer-readable medium storing instructions that, when executed by a processor, cause the processor to perform operations is disclosed. The operations include initiating transmission, from a first base station to a second base station, of a secondary node (SN) addition request message corresponding to a user equipment (UE) associated with the first base station. The SN addition request message includes a request for full configuration. The operations further include receiving, from the second base station, a SN addition response message. The SN addition response message includes an indicator of acceptance of the full configuration.

Other aspects, features, and embodiments will become apparent to those of ordinary skill in the art, upon reviewing the following description of specific, exemplary embodiments in conjunction with the accompanying figures. While features may be discussed relative to certain embodiments and figures below, various embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
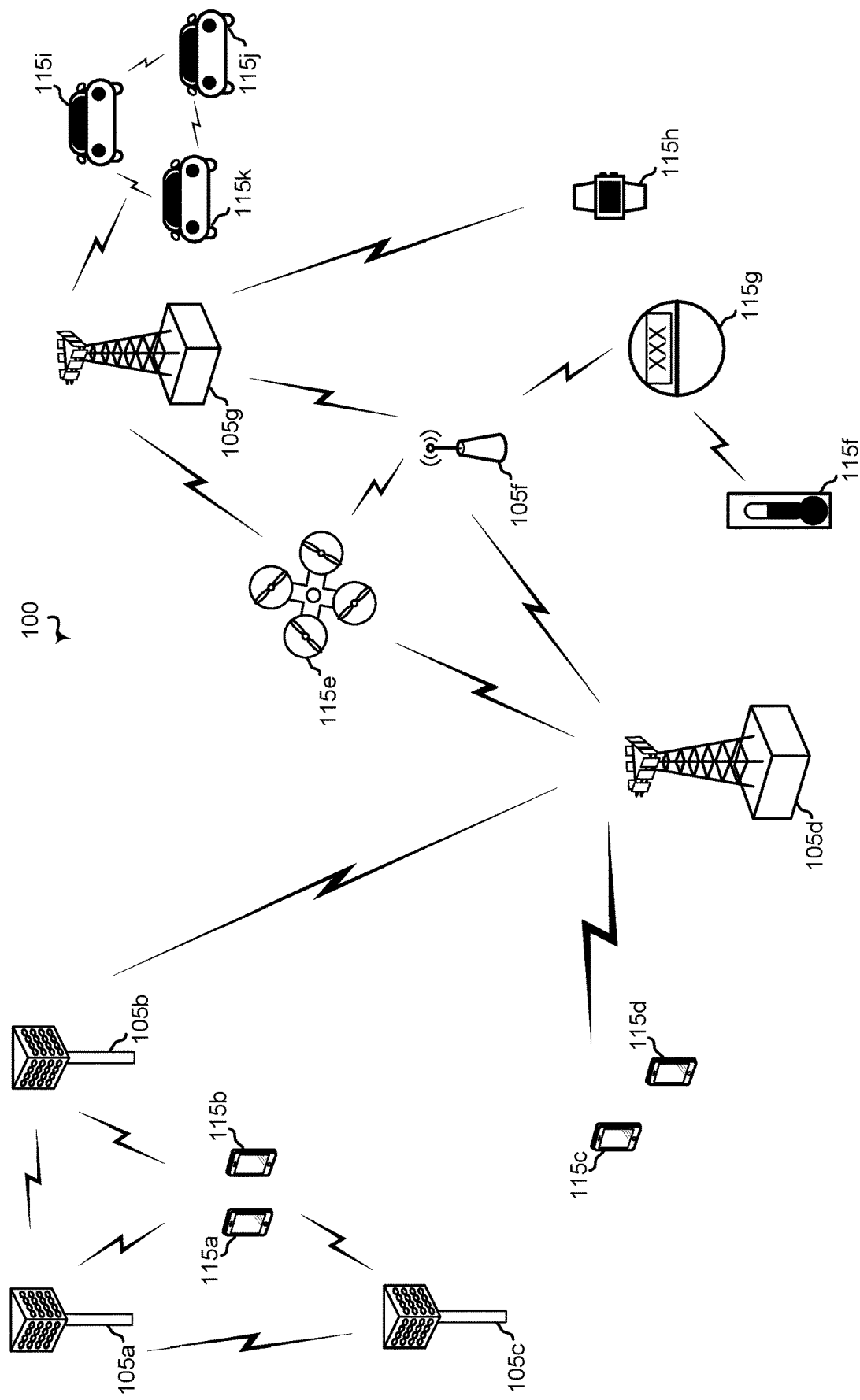
FIG. 1 is a block diagram illustrating details of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
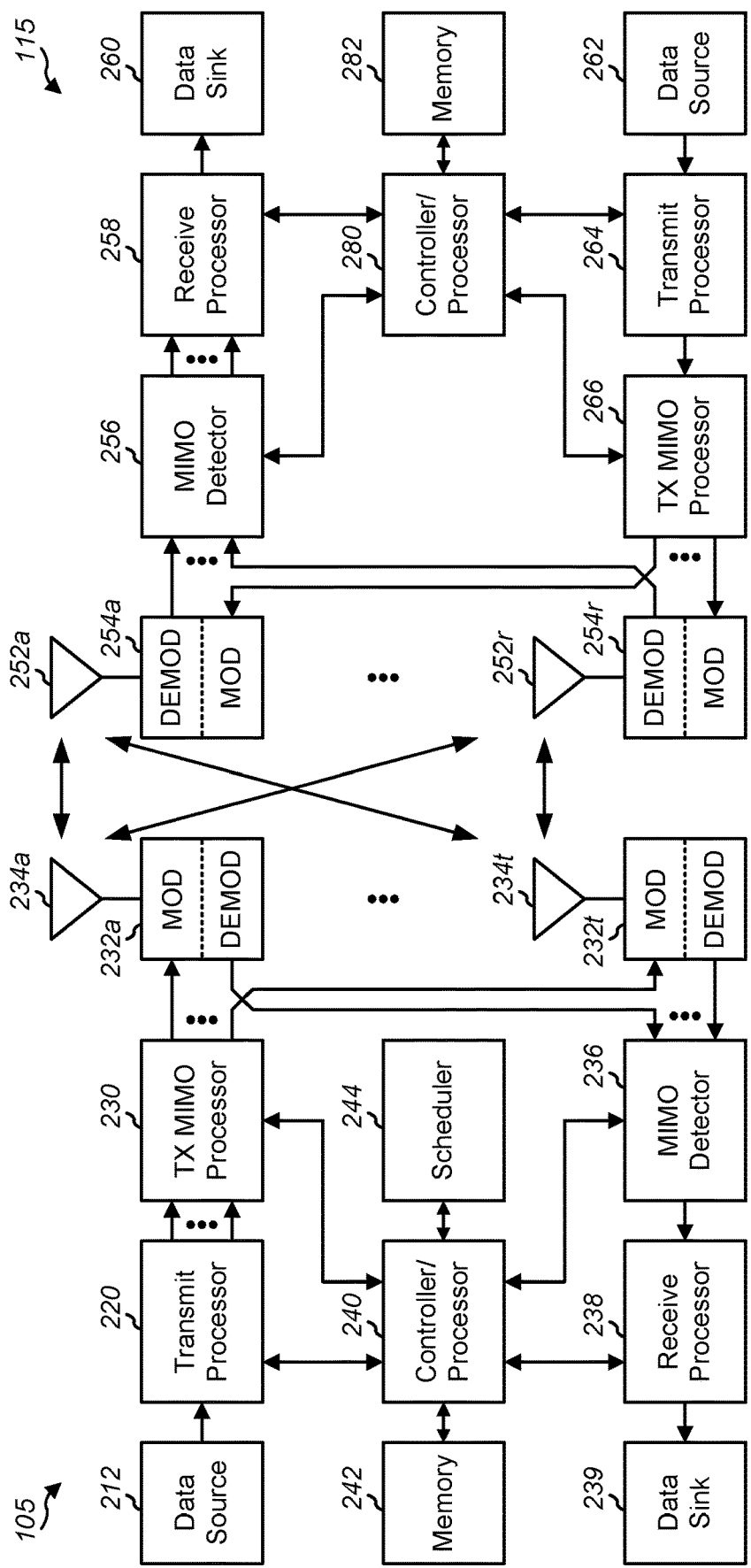
FIG. 2 is a block diagram conceptually illustrating a design of a base station and a UE configured according to some aspects of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 5-6, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators. In some cases, the shared spectrum may be accessed by a UE and a base station of a network operator to perform communications, such as voice or data communications, or to update information by the UE as the UE changes location and is handed over from one base station to another base station, based on the centrally controlled arbitration scheme, the predefined arbitration scheme, or based on dynamic determinations at the UE or the base stations.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
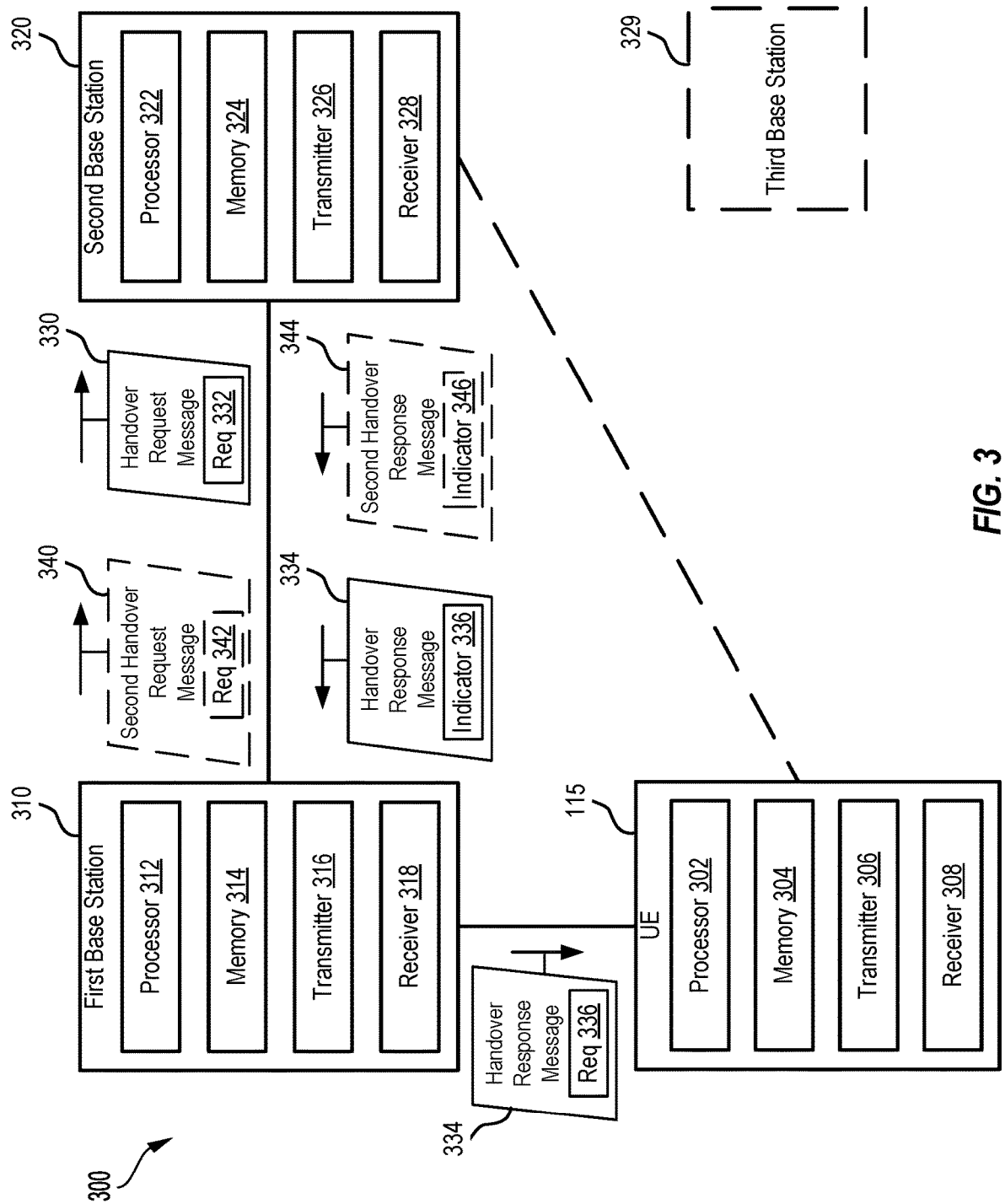
FIG. 3 is a block diagram of a wireless communication system that includes a base station that requests full configuration from another base station during a handover in accordance with aspects of the present disclosure.

FIG. 3 is a block diagram of an example wireless communications system 300 that includes a base station that requests full configuration from another base station during a handover. In some examples, wireless communications system 300 may implement aspects of wireless network 100. For example, wireless communications system 300 may include UE 115. Wireless communications system 300 may also include first base station 310, second base station 320, and optionally, third base station 329. Although one UE and two (or three) base stations are illustrated, in other implementations, wireless communications system 300 may include multiple UEs 115, more than two (or three) base stations, or both.

UE 115 includes a processor 302, a memory 304, a transmitter 306, and a receiver 308. Processor 302 may be configured to execute instructions stored at memory 304 to perform the operations described herein. In some implementations, processor 302 includes or corresponds to controller/processor 280, and memory 304 includes or corresponds to memory 282.

Transmitter 306 is configured to transmit data to one or more other devices, and receiver 308 is configured to receive data from one or more other devices. For example, transmitter 306 may transmit data, and receiver 318 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 306 and receiver 308 may be replaced with a transceiver. Additionally, or alternatively, transmitter 306, receiver 308, or both may include or correspond to one or more components of UE 115 described with reference to FIG. 2.

First base station 310 includes processor 312, memory 314, transmitter 316, and receiver 318. Processor 312 may be configured to execute instructions stored at memory 314 to perform the operations described herein. In some implementations, processor 312 includes or corresponds to controller/processor 240, and memory 314 includes or corresponds to memory 242.

Transmitter 316 is configured to transmit data to one or more other devices, and receiver 318 is configured to receive data from one or more other devices. For example, transmitter 316 may transmit data, and receiver 318 may receive data, via a network, such as a wired network, a wireless network, or a combination thereof. For example, first base station 310 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 316 and receiver 318 may be replaced with a transceiver. Additionally, or alternatively, transmitter 316, receiver, 318, or both may include or correspond to one or more components of base station 105 described with reference to FIG. 2.

Second base station 320 includes processor 322, memory 324, transmitter 326, and receiver 328. Processor 322 may be configured to execute instructions stored at memory 324 to perform the operations described herein.

Transmitter 326 is configured to transmit data to one or more other devices, and receiver 328 is configured to receive data from one or more other devices. For example, transmitter 326 may transmit data, and receiver 328 may receive data, via a network, such as a wired network, a wireless network, or a combination thereof. For example, second base station 320 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 326 and receiver 328 may be replaced with a transceiver. Additionally, or alternatively, transmitter 326, receiver, 328, or both may include or correspond to one or more components of base station 105 described with reference to FIG. 2.

In implementations that include third base station 329, third base station 329 may include components similar to first base station 310 or second base station 320. For example, third base station 329 may include a processor, a memory, a transmitter, and a receiver.

In a particular implementation, wireless communications system 300 includes a fifth generation (5G) network. For example, first base station 310, second base station 320, or both, are 5G base stations (e.g., configured to operate in accordance with a 5G standard). Additionally, UE 115 may include a 5G UE (e.g., a UE configured to operate in accordance with a 5G network).

During operation of wireless communications system 300, UE 115 is associated with first base station 310 and a handover situation may occur. For example, UE 115 may transmit a measurement report to first base station 310, and based on the measurement report (and measurements of cells of other base stations, such as second base station 320), first base station 310 may determine to handover UE 115 to second base station 320. Such a handover may be referred to as a "legacy handover" or a "non-conditional handover" because first base station 310 determines to initiate the handover procedure based on the measurement report. If cell quality diminishes rapidly, UE 115 may be unable to send the measurement report, resulting in first base station 310 failing to initiate the handover, which may result in handover failure and dropped calls. As used herein, "legacy handovers" and "non-conditional handovers" include or correspond to handovers that are initiated and controlled by base stations, such as based on measurement reports received at the base stations.

In some other implementations, handovers may be "conditional handovers." In a conditional handover, first base station 310 may provide a set of conditions to UE 115, the set of conditions indicating when UE 115 is able to be handed over to another base station, such as second base station 320. If one or more of the conditions are satisfied, UE 115 associates with second base station (without waiting for further instructions from first base station 310). Thus, the timing of the conditional handover is not known ahead of time (and may never happen, depending on whether the conditions are satisfied). As used herein, "conditional handovers" include or correspond to handovers that are at least partially controlled by UEs, such as based on conditions from base stations, and that are conditional (e.g., that may not be performed or completed based on situations at the UEs).

In some scenarios, parameter sharing may be involved in handover techniques discussed herein. As one example, in order for UE 115 to be handed over to second base station 320, UE 115 may require the parameters used by second base station 320 in order to associate with second base station 320. In conventional legacy handovers and conventional conditional handovers, first base station 310 may transmit a handover request message to second base station 320. The handover request may include the parameters used by first base station 310 and UE 115. Second base station 320 may respond with a handover response message that includes a "delta configuration." The delta configuration indicates the differences in parameters between the parameters of first base station 310 and second base station 320. Although sending the parameters as the delta configuration saves overhead (as compared to sending all the parameters used by second base station 320), the delta configuration may spur challenges (e.g., in conditional handovers, where the parameters of first base station 310 or UE 115 may change before the handover occurs). If such change occurs, the delta values can become difficult to use (e.g., due to staleness or other factors), unless UE 115 stores all the previous parameters used by first base station 310 in addition to current parameters used by first base station 310.

Aspects and implementations of the present disclosure set forth techniques aimed at facilitating handovers. Handover facilitation techniques can include utilizing configuration sharing features. In this manner, communication devices can share configuration parameters with each other (e.g., a base station sharing with another base station, a UE sharing with a base station, and/or a base station sharing with a UE). In some scenarios, improved configuration sharing can avoid uncertainty of the delta configuration by using handover requests and handover responses that include "full configuration." As used herein, "full configuration" generally means sharing initial parameters (and not just delta configuration values). Initial parameters can include one or more initial access stratum configuration parameters. Communication devices can use access stratum configuration parameters for establishing a connection between two devices (e.g., a UE and a base station) and for enabling wireless communication between the two devices.

Full configuration sharing may also include other additional or alternative features. In one particular example, a full configuration may comprise or include a full set of parameters used by second base station 320 (e.g., the set of parameters provided to a UE by second base station 320 as part of an initial connection/registration), irrespective of the parameters of first base station 310. As an example, a full set of parameters may include one or more of network identifiers, network slicing information, network slice selection assistance information (NSSAI), supported network features (e.g., power control, multi-input, multiple-output (MIMO) support, carrier aggregation (CA), and the like), physical data unit (PDU) parameters, local area data network (LADN) parameters, a mobile initiated connection only (MICO) mode indicator, service area parameters, timer durations, emergency numbers, steering of roaming (SOR) transparent container information, extensible authentication protocol (EAP) parameters, operator-defined access category definitions, discontinuous reception (DRX) parameters, other parameters, or a combination thereof. In alternative or additional scenarios, "full configuration" may include disregarding source base station configuration information. In some cases, a configuration designated as "full" or "non-full" may be set by standards bodies (e.g., such as 3GPP). Use of full configuration techniques can enable and provide, in some scenarios, improved handover scenarios aimed at improving mobility, user experience, and power efficiencies.

To illustrate various aspects described above, several examples illustrate handover facilitation. As one example, in a handover situation, a first base station 310 may transmit a handover request message 330 to a second base station 320. First base station 310 may include or correspond to a source base station (e.g., a base station to which UE 115 is associated), and second base station 320 may include or correspond to a target base station (e.g., a base station to which UE 115 will be handed over). Handover request message 330 may correspond to a UE associated with first base station 310 (e.g., UE 115).

According to some arrangements, a handover request message 330 can include a request 332 for a configuration of interest. This configuration of interest can be a request for full configuration or some other configuration type. For example, request 332 can include a full configuration request that may correspond to a flag or other indicator included in handover request message 330. Such a flag or indicator can be represented in various manners. For example, the flag may be a single bit within handover request message 330. A first value (e.g., a logical '1' value) of the single bit may indicate that full configuration is requested, and a second value (e.g., a logical '0' value) of the single bit may indicate that the full configuration is not requested (e.g., that the delta configuration is acceptable). In some implementations, the flag may be included in a header portion of handover request message 330. In some other implementations, the flag may be included in other portions of handover request message 330.

After transmitting handover request message 330, first base station 310 may receive, from second base station 320, a handover response message 334. Handover response message 334 may include an indicator 336 of acceptance of the full configuration. For example, in response to receiving handover request message 330, second base station 320 may generate handover response message 334 that includes indicator 336 that indicates whether the full configuration requested by handover request message 330 is accepted. In some implementations, indicator 336 corresponds to a flag included in handover response message 334. For example, the flag may be a single bit within handover response message 334. A first value (e.g., a logical '1' value) of the single bit may indicate that the full configuration is accepted, and a second value (e.g., a logical '0' value) of the single bit may indicate that the full configuration is not accepted. In some implementations, the flag may be included in a header portion of handover response message 334. In some other implementations, the flag may be included in other portions of handover response message 334. In some other implementations, handover response message 334 does not include a flag. In some such implementations, indicator 336 may correspond to a particular information element included in handover response message 334.

Handover response message 334 may include the parameters used by second base station 320. For example, handover response message 334 may include an initial set of parameters, such as access stratum configuration parameters, provided to devices to enable an initial connection with second base station 320. In some implementations, the set of parameters are included in a particular information element of handover response message 334. For example, a radio resource control (RRC) message including the set of parameters may be included in a particular information element of handover response message 334. The RRC message may include or correspond to indicator 336. In such implementations, first base station 310 may determine that indicator 336 (e.g., the RRC message) is included in handover response message 334 by performing packet inspection on handover response message 334. However, this may increase the complexity of the processing performed by first base station 310 and decrease overall speed of the handover. Thus, in some other implementations, indicator 336 corresponds to a flag in handover response message 334 so that first base station 310 does not have to perform packet inspection on handover response message 334 to determine that the full configuration is accepted.

After receiving handover response message 334 from second base station 320, first base station 310 may be configured to pass handover response message 334 (including the set of parameters corresponding to second base station 320) to UE 115. For example, first base station 310 may transmit handover response message 334 from first base station 310 to UE 115 based on handover response message 334 including indicator 336 (and indicator 336 indicating acceptance of the full configuration). If indicator 336 does not indicate acceptance, first base station 310 can still forward handover response message 334 to UE 115, or first base station 310 can declare a handover failure and try again with the second base station 320 or with another base station.

The exchange of handover request message 330 and handover response message 334 can occur for different types of handover operations. For example, handover request message 330 may be part of a legacy (e.g., non-conditional) handover. To illustrate, first base station 310 may determine to handover UE 115 to second base station 320 based at least in part on a measurement report from UE 115. First base station 310 may determine that second base station 320 has the best cell for UE 115 and thus may select second base station 320 for the legacy handover operation. As another example, handover request message 330 may be part of a conditional handover. To illustrate, first base station 310 may send a set of conditions to UE 115 that indicate when UE 115 can be handed over to another base station. Additionally, first base station 310 may obtain configuration information (e.g., parameters) for one or more base stations for UE 115 to conditionally be handed over to. For example, first base station 310 may transmit handover request message 330 to second base station 320. Additionally, in some implementations, first base station 310 may transmit, to third base station 329, another handover request message corresponding to UE 115. The another handover request message may include another request for full configuration. In response, first base station 310 may receive, from third base station 329, another handover response message including another indicator of whether the full configuration is accepted. If the full configuration is accepted, the another handover response message may also include a set of parameters used by third base station 329.

In some implementations, first base station 310 may repeat handover request procedures based on certain determinations. To illustrate, first base station 310 may determine that a target radio resource control (RRC) configuration is no longer valid. In some implementations, determining that a target RRC configuration is no longer valid includes determining that a RRC configuration used by first base station 310 is about to change. Additionally, or alternatively, determining that the target RRC configuration is no longer valid may be based on a determination that a capability of UE 115 has changed. For example, UE 115 may change a number of active antennas or a multiple input, multiple output (MIMO) parameter, as non-limiting examples. Additionally, or alternatively, determining that the target RRC configuration is no longer valid may be based on a determination that one or more security keys corresponding to a wireless network that includes first base station 310 and second base station 320 have changed. For example, if a core network device changes one or more security keys, the parameters used by second base station 320 (and included in handover response message 334) may no longer be valid. Based on the determination (e.g., that the target RRC configuration is no longer valid), first base station 310 may transmit, from first base station 310 to second base station 320, a second handover request message 340 corresponding to UE 115. Second handover request message 340 includes a second request 342 for full configuration. Similar to request 332, in some implementations, second request 342 may include a flag included in a portion, such as a header portion, of second handover request message 340.

After transmitting second handover request message 340, first base station 310 may receive, from second base station 320, a second handover response message 344. Second handover response message 344 may include a second indicator 346 of acceptance of the full configuration. Similar to indicator 336, in some implementations, second indicator 346 may include a flag that is included in a portion, such as a header portion, of second handover response message 344. In some other implementations, second indicator 346 may include a particular information element included in second handover response message 344. After receiving second handover response message 344, first base station 310 may transmit second handover response message 344 to UE 115 based on second handover response message 344 including second indicator 346. Forwarding second handover response message 344 to UE 115 may provide UE 115 with updated parameters used by second base station 320 for use in performing a handover procedure.

Thus, FIG. 3 illustrates wireless communication system 300 in which a source base station (e.g., first base station 310) requests that a target base station (e.g., second base station 320) provide full configuration (e.g., a full set of parameters) in a handover response message, as opposed to providing delta configuration parameters, as in conventional handover techniques. The full configuration parameters may be provided in conditional handovers or in legacy (e.g., non-conditional) handovers. Using full configuration (instead of the delta configuration) may increase the likelihood that one or more parameters used by UE 115 are the correct (e.g., up-to-date) parameters for associating with second base station 320, which may reduce (or prevent) handover failures.

Figure 4:
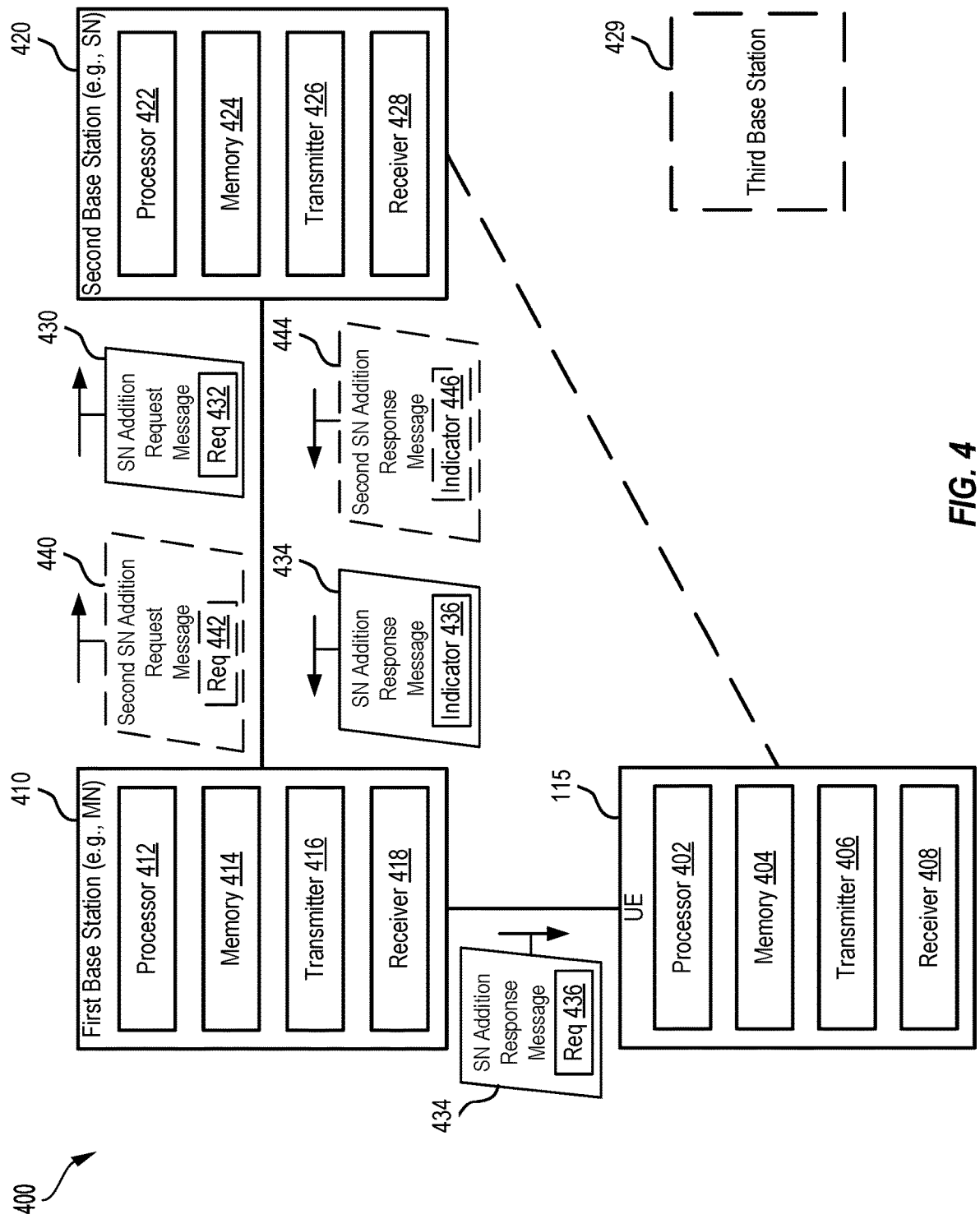
FIG. 4 is a block diagram of a wireless communication system that includes a base station that requests full configuration from another base station during one or more secondary node (SN) addition operations in accordance with aspects of the present disclosure.

FIG. 4 is a block diagram of an example wireless communications system 400 that includes a base station that requests full configuration from another base station during one or more secondary node (SN) addition operations. This may include, for example, secondary or tertiary node additions. Node additions may include adding one or more other base stations as additional nodes. In some examples, wireless communications system 400 may implement aspects of wireless network 100. For example, wireless communications system 400 may include UE 115. Wireless communications system 400 may also include first base station 410, second base station 420, and optionally, third base station 429. Although one UE and two (or three) base stations are illustrated, in other implementations, wireless communications system 400 may include multiple UEs 115, multiple base stations, or both.

UE 115 includes a processor 402, a memory 404, a transmitter 406, and a receiver 408. Processor 402 may be configured to execute instructions stored at memory 404 to perform the operations described herein. In some implementations, processor 402 includes or corresponds to controller/processor 280, and memory 404 includes or corresponds to memory 282.

Transmitter 406 is configured to transmit data to one or more other devices, and receiver 408 is configured to receive data from one or more other devices. For example, transmitter 406 may transmit data, and receiver 418 may receive data, via a network, such as a wired network, a wireless network, or a combination thereof. For example, UE 115 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 406 and receiver 408 may be replaced with a transceiver. Additionally, or alternatively, transmitter 406, receiver 408, or both may include or correspond to one or more components of UE 115 described with reference to FIG. 2.

First base station 410 includes processor 412, memory 414, transmitter 416, and receiver 418. Processor 412 may be configured to execute instructions stored at memory 414 to perform the operations described herein. In some implementations, processor 412 includes or corresponds to controller/processor 240, and memory 414 includes or corresponds to memory 242.

Transmitter 416 is configured to transmit data to one or more other devices, and receiver 418 is configured to receive data from one or more other devices. For example, transmitter 416 may transmit data, and receiver 418 may receive data, via a network, such as a wired network, a wireless network, or a combination thereof. For example, first base station 410 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 416 and receiver 418 may be replaced with a transceiver. Additionally, or alternatively, transmitter 416, receiver, 418, or both may include or correspond to one or more components of base station 105 described with reference to FIG. 2.

Second base station 420 includes processor 422, memory 424, transmitter 426, and receiver 428. Processor 422 may be configured to execute instructions stored at memory 424 to perform the operations described herein.

Transmitter 426 is configured to transmit data to one or more other devices, and receiver 428 is configured to receive data from one or more other devices. For example, transmitter 426 may transmit data, and receiver 428 may receive data, via a network, such as a wired network, a wireless network, or a combination thereof. For example, second base station 420 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 426 and receiver 428 may be replaced with a transceiver. Additionally, or alternatively, transmitter 426, receiver, 428, or both may include or correspond to one or more components of base station 105 described with reference to FIG. 2.

In implementations that include third base station 429, third base station 429 may include components similar to first base station 410 or second base station 420. For example, third base station 429 may include a processor, a memory, a transmitter, and a receiver.

In a particular implementation, wireless communications system 400 includes a 5G network. For example, first base station 410, second base station 420, or both, are 5G base stations (e.g., base stations configured to operate in accordance with a 5G standard). Additionally, UE 115 may include a 5G UE (e.g., a UE configured to operate in accordance with a 5G network). In some implementations, UE 115 may be a dual connectivity UE configured to operate in accordance with a 4G (e.g., a long-term evolution (LTE)) standard and with a 5G standard, such as a 3GPP standard.

During operation of wireless communications system 400, a dual-connectivity UE, such as UE 115, may connect to base stations operating in accordance with different standards. One of the base stations may act as a primary or lead node (PN), and the other base station(s) may act as secondary or subordinate nodes (SNs). UE 115 may receive control information from the PN and from any SNs. In some implementations, the PN may operate in accordance with a 4G (e.g., a LTE) standard, and the SN(s) may operate in accordance with a 5G (e.g., new radio (NR)) standard. The PN (e.g., first base station 410) may enable UE 115 to add additional SNs (e.g., to associate with additional SNs) by performing SN addition procedures, which may be similar to handover procedures except that UE 115 does not disconnect from the PN. Similarly, currently connected SNs may be changed (e.g., handed over) to other SNs in a similar manner.

To illustrate, in a situation in which a SN is to be added (or changed), first base station 410 may transmit a SN addition request message 430 to second base station 420. First base station 410 may be configured to operate as a PN, and second base station 420 may be configured to operate as a SN. Second base station 420 may be applicable for a SN change procedure. SN addition request message 430 may correspond to a UE associated with first base station 410 (e.g., UE 115).

SN addition request message 430 includes a request 432 for full configuration. Similar to as described above with reference to handovers, full configuration for SN addition operations may include or correspond to an initial set of parameters, such as access stratum configuration parameters or other configuration parameters for establishing an initial connection, used to initially connect a device (e.g., a UE) to a base station operating as a SN. A size of a full configuration parameter set may vary based on the network features, such as CA, MIMO, and the like, that are supported by the base station. In some implementations, a request for full configuration may be indicated by a flag or another indicator. For example, request 432 for full configuration may correspond to a flag included in SN addition request message 430. For example, request 432 for full configuration may be a single bit within SN addition request message 430. A first value (e.g., a logical '1' value) of the single bit may indicate that the full configuration is requested, and a second value (e.g., a logical '0' value) of the single bit may indicate that the full configuration is not requested (e.g., that the delta configuration is acceptable). In some implementations, the flag may be included in a header portion of SN addition request message 430. In some other implementations, the flag may be included in other portions of SN addition request message 430.

After transmitting SN addition request message 430, first base station 410 may receive, from second base station 420, a SN addition response message 434. SN addition response message 434 may include an indicator 436 of acceptance of the full configuration. For example, in response to receiving SN addition request message 430, second base station 420 may generate SN addition response message 434 that includes indicator 436 that indicates whether the full configuration requested by SN addition request message 430 is accepted. In some implementations, indicator 436 corresponds to a flag included in SN addition response message 434. For example, the flag may be a single bit within SN addition response message 434. A first value (e.g., a logical '1' value) of the single bit may indicate that the full configuration is accepted, and a second value (e.g., a logical '0' value) of the single bit may indicate that the full configuration is not accepted. In some implementations, the flag may be included in a header portion of SN addition response message 434. In some other implementations, the flag may be included in other portions of SN addition response message 434. In some implementations, SN addition response message 434 does not include a flag. In some such implementations, indicator 436 may correspond to a particular information element included in SN addition response message 434.

SN addition response message 434 may include the parameters used by second base station 420. For example, SN addition response message 434 may include an initial set of parameters, such as access stratum configuration parameters or other configuration parameters, provided to devices to enable an initial connection with second base station 420. In some implementations, the set of parameters are included in a particular information element of SN addition response message 434. For example, a RRC message including the set of parameters may be included in a particular information element of SN addition response message 434. The RRC message may include or correspond to indicator 436. In such implementations, first base station 410 may determine that indicator 436 (e.g., the RRC message) is included in SN addition response message 434 by performing packet inspection on SN addition response message 434. However, this may increase the complexity of the processing performed by first base station 410 and decrease overall speed of the SN addition or SN changing process. Thus, in some other implementations, indicator 436 corresponds to a flag in SN addition response message 434 so that first base station 410 does not have to perform packet inspection on SN addition response message 434 to determine that the full configuration is accepted.

After receiving SN addition response message 434 from second base station 420, first base station 410 may be configured to pass SN addition response message 434 (including the set of parameters corresponding to second base station 420) to UE 115. For example, first base station 410 may transmit SN addition response message 434 from first base station 410 to UE 115 based on SN addition response message 434 including indicator 436 (and indicator 436 indicating acceptance of the full configuration). If indicator 436 does not indicate acceptance, first base station 410 can still forward SN addition response message 434 to UE 115, or first base station 410 can declare a SN addition failure and try again with second base station 420 or with another base station.

The exchange of SN addition request message 430 and SN addition response message 434 can occur for different types of SN additions. For example, SN addition request message 430 may be part of a "legacy SN addition" (a "non-conditional SN addition"). As used herein, "legacy SN additions" and "non-conditional SN additions" include or correspond to one or more SN addition operations that are initiated and controlled by PNs (e.g., base stations), such as based on information at the PN. To illustrate, the SN addition operation may be initiated by first base station 410. As another example, SN addition request message 430 may be part of a "conditional SN addition." As used herein, "conditional SN additions" include or correspond to one or more SN addition operations that are at least partially controlled by UEs, such as based on conditions from PNs, and that are conditional (e.g., that may not be performed or completed based on situations at the UEs). To illustrate, the SN addition procedure may be initiated by UE 115. Additionally, first base station 410 may obtain configuration information (e.g., parameters) for more than one SNs (e.g., base stations) to be conditionally added. For example, first base station 410 may transmit SN addition request message 430 to second base station 420. Additionally, in some implementations, first base station 410 may transmit, to third base station 429, another SN addition request message corresponding to UE 115. The another SN addition request message may include another request for full configuration. In response, first base station 410 may receive, from third base station 429, another SN addition response message including another indicator of whether the full configuration is accepted. If the full configuration is accepted, the another SN addition response message may also include a set of parameters used by third base station 429.

In some implementations, first base station 410 may repeat the SN addition request procedure based on certain determinations. To illustrate, first base station 410 may determine that a target RRC configuration is no longer valid. In some implementations, determining that a target RRC configuration is no longer valid includes determining that a RRC configuration that affects the SN will change. Changes to RRC configurations that affect the PN, but not the SN, may be ignored for these determinations. Additionally, or alternatively, determining that the target RRC configuration is no longer valid may be based on a determination that a capability of UE 115 has changed. For example, UE 115 may change a number of active antennas or a MIMO parameter, as non-limiting examples. Additionally, or alternatively, determining that the target RRC configuration is no longer valid may be based on a determination that one or more security keys corresponding to a wireless network that includes first base station 410 and second base station 420 have changed. For example, if a core network device changes one or more security keys, the parameters used by second base station 420 (and included in SN addition response message 434) may no longer be valid. Based on the determination (e.g., that the target RRC configuration is no longer valid), first base station 410 may transmit, from first base station 410 to second base station 420, a second SN addition request message 440 corresponding to UE 115. Second SN addition request message 440 may include a second request 442 for full configuration. Similar to request 432, in some implementations, second request 442 may include a flag included in a portion, such as a header portion, of second SN addition request message 440.

After transmitting second SN addition request message 440, first base station 410 may receive, from second base station 420, a second SN addition response message 444. Second SN addition response message 444 may include a second indicator 446 of acceptance of the full configuration. Similar to indicator 436, in some implementations, second indicator 446 may include a flag that is included in a portion, such as a header portion, of second SN addition response message 444. In some other implementations, second indicator 446 may include a particular information element included in second SN addition response message 444. After receiving second SN addition response message 444, first base station 410 may transmit second SN addition response message 444 to UE 115 based on second SN addition response message 444 including second indicator 446. Forwarding second SN addition response message 444 to UE 115 may provide UE 115 with updated parameters used by second base station 420 for use in performing a SN addition procedure.

Although described in the context of an SN addition procedure (e.g., adding a new SN to dual-connectivity UE 115), in other implementations, the operations described with reference to FIG. 4 may be performed when changing a SN to which UE 115 is associated. For example, instead of adding second base station 420, third base station 429 may be changed (e.g., handed over) to second base station 420. In such implementations, the request for changing the SN may include a request for full configuration, as described above.

Thus, FIG. 4 illustrates wireless communication system 400 in which a PN (e.g., first base station 410) requests that a SN (e.g., second base station 420) provide full configuration (e.g., a full set of parameters) in a SN addition response message, as compared to providing delta configuration parameters. The full configuration parameters may be provided in conditional or legacy (e.g., non-conditional) SN additions. Using the full configuration (instead of the delta configuration) may increase the likelihood that the parameters used by UE 115 are the correct (e.g., up-to-date) parameters for associating with second base station 420, which may reduce (or prevent) SN addition or change failures.

Figures 5, 6:
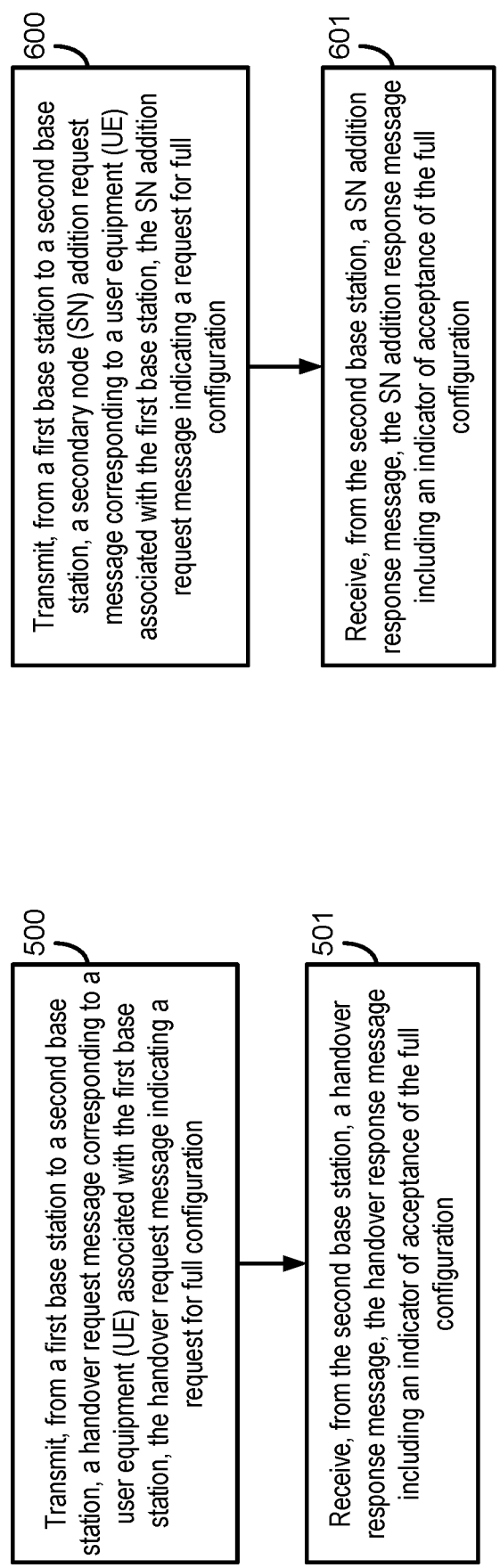
FIG. 5 is a block diagram illustrating example blocks illustrated by a base station configured according to an aspect of the present disclosure.
FIG. 6 is a block diagram illustrating example blocks illustrated by a base station configured according to an aspect of the present disclosure.
Figure 7:
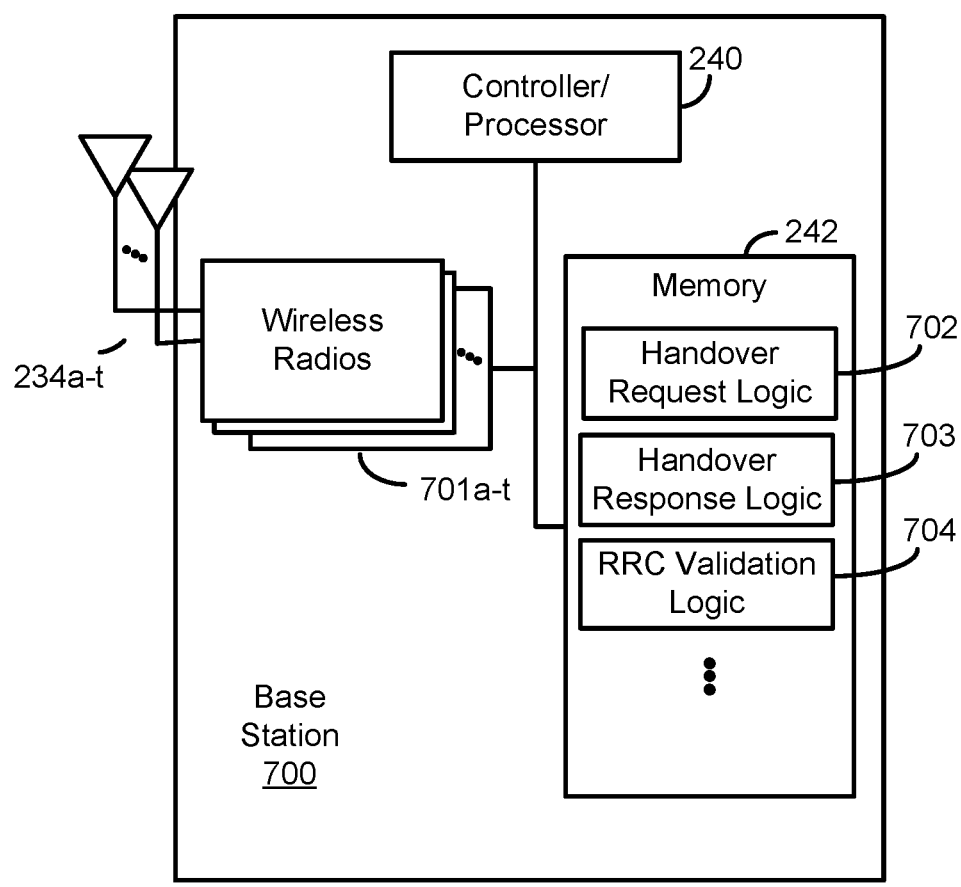
FIG. 7 is a block diagram conceptually illustrating a design of a base station configured to send handover request messages according to some aspects of the present disclosure.

FIG. 5 is a block diagram illustrating example blocks executed to implement one aspect of the present disclosure. The example blocks will also be described with respect to base station 700 as illustrated in FIG. 7. FIG. 7 is a block diagram illustrating base station 700 configured according to one aspect of the present disclosure. In some implementations, base station 700 may include or correspond to base station 105, first base station 310, or first base station 410. Base station 700 includes the structure, hardware, and components as illustrated for base station 105 of FIG. 2. For example, base station 700 includes controller/processor 240, which operates to execute logic or computer instructions stored in memory 242, as well as controlling the components of base station 700 that provide the features and functionality of base station 700. Base station 700, under control of controller/processor 240, transmits and receives signals via wireless radios 701*a-t* and antennas 234*a-t*. Wireless radios 701*a-t* include various components and hardware, as illustrated in FIG. 2 for base station 105, including modulator/demodulators 232*a-t*, MIMO detector 236, receive processor 238, transmit processor 220, and TX MIMO processor 230.

At block 500, a first base station transmits, to a second base station, a handover request message corresponding to a user equipment (UE) associated with the first base station. The handover request message indicates a request for full configuration. A base station, such as base station 700, may execute, under control of controller/processor 240, handover request logic 702 stored in memory 242. The execution environment of handover request logic 702 provides the functionality for base station 700 to generate and transmit, via antennas 234*a-t*, a handover request message that indicates a request for full configuration. In some implementations, the request for full configuration may be indicated by a flag included in the handover request message. The request for full configuration may include or correspond to a request for an initial set of access stratum configuration parameters (or other parameters used to initially establish a connection with the second base station).

At block 501, the first base station receives, from the second base station, a handover response message. The handover response message includes an indicator of acceptance of the full configuration. The base station (e.g., base station 700) may execute, under control of controller/processor 240, handover response logic 703 stored in memory 242. The execution environment of handover response logic 703 provides the functionality for base station 700 to receive, from the second base station (e.g., a target base station), a handover response message that includes an indicator of acceptance of the full configuration. In some implementations, the indicator may be a flag included in the handover response message. In some other implementations, the indicator may be a particular information element included in the handover response message. In some implementations, the execution environment of handover response logic 703 provides the functionality for base station 700 to transmit the handover response message to the associated UE (e.g., UE 115).

In some implementations, the first base station determines that a target RRC configuration is no longer valid and, based on the determination, transmits a second handover request message including a second request for full configuration. The base station (e.g., base station 700) may execute, under control of controller/processor 240, RRC validation logic 704 stored in memory 242. The execution environment of RRC validation logic 704 provides the functionality for base station 700 to determine whether a target RRC configuration is no longer valid. In some implementations, determining that the target RRC configuration is no longer valid is based on a determination that a capability of the associated UE has changed. Additionally, or alternatively, determining that the target RRC configuration is no longer valid may be based on a determination that one or more security keys corresponding to a wireless network that includes base station 700 have changed.

Figure 8:
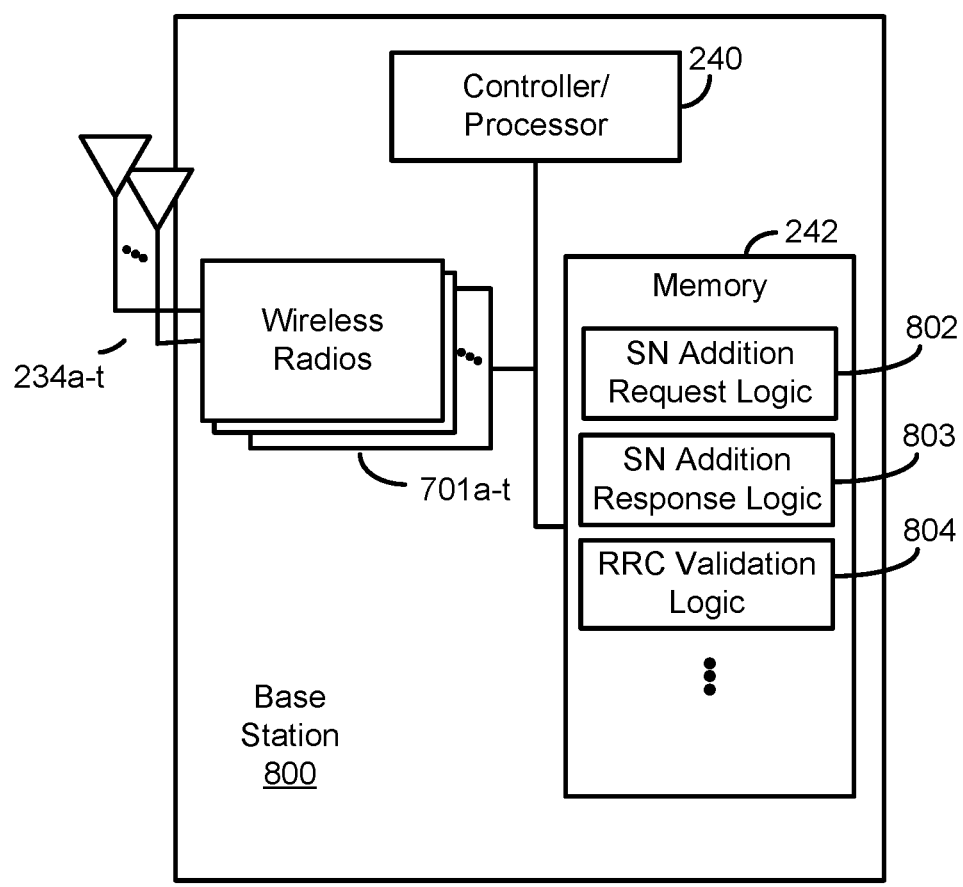
FIG. 8 is a block diagram conceptually illustrating a design of another base station configured to send SN addition request messages according to some aspects of the present disclosure.

FIG. 6 is a block diagram illustrating example blocks executed to implement one aspect of the present disclosure. The example blocks will also be described with respect to base station 800 as illustrated in FIG. 8. FIG. 8 is a block diagram illustrating base station 800 configured according to one aspect of the present disclosure. In some implementations, base station 800 may include or correspond to base station 105, first base station 310, or first base station 410. Base station 800 includes the structure, hardware, and components as illustrated for base station 105 of FIG. 2. For example, base station 800 includes controller/processor 240, which operates to execute logic or computer instructions stored in memory 242, as well as controlling the components of base station 800 that provide the features and functionality of base station 800. Base station 800, under control of controller/processor 240, transmits and receives signals via wireless radios 801a-t and antennas 234a-t. Wireless radios 801a-t includes various components and hardware, as illustrated in FIG. 2 for base station 105, including modulator/demodulators 232a-t, MIMO detector 236, receive processor 238, transmit processor 220, and TX MIMO processor 230.

At block 600, a first base station transmits, to a second base station, a secondary node (SN) addition request message corresponding to a user equipment (UE) associated with the first base station. The SN addition request message indicates a request for full configuration. A base station, such as base station 800, may execute, under control of controller/processor 240, SN addition request logic 802 stored in memory 242. The execution environment of SN addition request logic 802 provides the functionality for base station 800 to generate and transmit, via antennas 234a-t, a SN addition request message that indicates a request for full configuration. In some implementations, the request for full configuration may be indicated by a flag included in the SN addition request message.

At block 601, the first base station receives, from the second base station, a SN addition response message. The SN addition response message includes an indicator of acceptance of the full configuration. The base station (e.g., base station 800) may execute, under control of controller/processor 240, SN addition response logic 803 stored in memory 242. The execution environment of SN addition response logic 803 provides the functionality for base station 800 to receive, from the second base station (e.g., a target base station), a SN addition response message that includes an indicator of acceptance of the full configuration. In some implementations, the indicator may be a flag included in the SN addition response message. In some other implementations, the indicator may be a particular information element included in the SN addition response message. In some implementations, the execution environment of SN addition response logic 803 provides the functionality for base station 800 to transmit the SN addition response message to the associated UE (e.g., UE 115).

In some implementations, the first base station determines that a target RRC configuration is no longer valid and, based on the determination, transmits a second SN addition request message including a second request for full configuration. The base station (e.g., base station 800) may execute, under control of controller/processor 240, RRC validation logic 804 stored in memory 242. The execution environment of RRC validation logic 804 provides the functionality for base station 800 to determine whether a target RRC configuration is no longer valid. In some implementations, determining that the target RRC configuration is no longer valid is based on a determination that a capability of the associated UE has changed. Additionally, or alternatively, determining that the target RRC configuration is no longer valid may be based on a determination that one or more security keys corresponding to a wireless network that includes base station 800 have changed.

Although FIGS. 7 and 8 illustrate different implementations of base stations (e.g., base station 700 and base station 800), in other implementations, the components of the base stations may be combined in a single base station. For example, a single base station may include handover request logic 702, handover response logic 703, RRC validation logic 704, SN addition request logic 802, SN addition response logic 803, and RRC validation logic 804 in a memory of the single base station. This base station may be capable of performing any or all of the operations described with reference to FIGS. 5-6.

In some aspects, techniques for enabling a base station to request full configuration from another base station during a handover may include additional aspects, such as any single aspect or any combination of aspects described below or in connection with one or more other processes or devices described elsewhere herein. In some aspects, enabling a request for full configuration during a handover process may include an apparatus configured to transmit, to a second base station, a handover request message corresponding to a UE associated with the apparatus. The handover request message includes a request for full configuration. The apparatus is further configured to receive, from the second base station, a handover response message. The handover response message includes an indicator of acceptance of the full configuration. In some implementations, the apparatus includes a wireless device, such as a first base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, the apparatus configures the request for full configuration to include a request for an initial set of access stratum configuration parameters from the second base station.

In a second aspect, alone or in combination with the first aspect, the apparatus transmits the handover response message from the apparatus to the UE based on the handover response message including the indicator.

In a third aspect, alone or in combination with one or more of the first through second aspects, the apparatus transmits, from the apparatus to a third base station, a second handover request message corresponding to the UE. The second handover request message includes a second request for full configuration.

In a fourth aspect, alone or in combination with one or more of the first through third aspects, the handover request message is part of a conditional handover or a legacy handover.

In a fifth aspect, alone or in combination with one or more of the first through fourth aspects, the apparatus determines that a target RRC configuration is no longer valid, transmits, based on the determination and from the apparatus to the second base station, a second handover request message corresponding to the UE, and receives, from the second base station, a second handover response message. The second handover request message includes a second request for full configuration. The second handover response message includes a second indicator of acceptance of the full configuration.

In a sixth aspect, in combination with the fifth aspect, determining that the target RRC configuration is no longer valid is based on a determination that a capability of the UE has changed.

In a seventh aspect, in combination with the fifth aspect, determining that the target RRC configuration is no longer valid is based on a determination that one or more security keys corresponding to a wireless network that includes the apparatus and the second base station have changed.

In an eighth aspect, alone or in combination with one or more of the fifth through seventh aspects, the apparatus transmits the second handover response message from the apparatus to the UE based on the second handover response message including the second indicator.

In a ninth aspect, alone or in combination with one or more of the first through eighth aspects, the request for full configuration corresponds to a flag included in the handover request message.

In a tenth aspect, alone or in combination with one or more of the first through ninth aspects, the indicator corresponds to a flag included in the handover response message.

In an eleventh aspect, alone or in combination with one or more of the first through ninth aspects, the indicator corresponds to a particular information element included in the handover response message.

In a twelfth aspect, alone or in combination with one or more of the first through eleventh aspects, the handover response message includes a set of parameters corresponding to the full configuration.

In a thirteenth aspect, in combination with the twelfth aspect, the set of parameters are included in a particular information element of the handover response message.

In some aspects, an apparatus configured for wireless communication, such as a first base station, is configured to transmit, from the apparatus to a second base station, a SN addition request message corresponding to a UE associated with the apparatus. The SN addition request message includes a request for full configuration. The apparatus is further configured to receive, from the second base station, a SN addition response message. The SN addition response message includes an indicator of acceptance of the full configuration. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a fourteenth aspect, the apparatus transmits the SN addition response message from the apparatus to the UE based on the SN addition response message including the indicator.

In an fifteenth aspect, alone or in combination with the fourteenth aspect, the apparatus transmits, from the apparatus to a third base station, a second SN addition request message corresponding to the UE. The second SN addition request message includes a second request for full configuration.

In a sixteenth aspect, alone or in combination with one or more of the fourteenth through fifteenth aspects, the SN addition request message is part of a conditional SN addition.

In a seventeenth aspect, alone or in combination with one or more of the fourteenth through fifteenth aspects, the SN addition request message is part of a legacy SN addition.

In an eighteenth aspect, alone or in combination with one or more of the fourteenth through seventeenth aspects, the apparatus determines that a target RRC configuration is no longer valid, transmits, based on the determination and from the apparatus to the second base station, a second SN addition request message corresponding to the UE, and receives, from the second base station, a second SN addition response message. The second SN addition request message includes a second request for full configuration. The second SN addition response message includes a second indicator of acceptance of the full configuration.

In a nineteenth aspect, in combination with the eighteenth aspect, determining that the target RRC configuration is no longer valid is based on a determination that a capability of the UE has changed.

In a twentieth aspect, in combination with the eighteenth aspect, determining that the target RRC configuration is no longer valid is based on a determination that one or more security keys corresponding to a wireless network that includes the apparatus and the second base station have changed.

In a twenty-first aspect, alone or in combination with one or more of the eighteenth through twentieth aspects, the apparatus transmits the second SN addition response message from the apparatus to the UE based on the second SN addition response message including the second indicator.

In a twenty-second aspect, alone or in combination with one or more of the fourteenth through twenty-first aspects, the apparatus is configured to operate as a primary node (PN), and the second base station is configured to operate as a SN.

In a twenty-third aspect, alone or in combination with one or more of the fourteenth through twenty-second aspects, the request for full configuration corresponds to a flag included in the SN addition request message.

In a twenty-fourth aspect, alone or in combination with one or more of the fourteenth through twenty-third aspects, the indicator corresponds to a flag included in the SN addition response message or a particular information element included in the SN addition response message.

In a twenty-fifth aspect, alone or in combination with one or more of the fourteenth through twenty-fourth aspects, the second base station is applicable for a SN change procedure.

In a twenty-sixth aspect, alone or in combination with one or more of the fourteenth through twenty-fifth aspects, the SN addition response message includes a set of parameters corresponding to the full configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to FIGS. 2-4 may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 5-6) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication at a first base station, the method comprising:
    transmitting, to a second base station, a handover request message corresponding to a user equipment (UE) associated with the first base station, the handover request message including a request for full configuration;
    receiving, from the second base station, a handover response message, the handover response message including an indicator of acceptance of the full configuration;
    transmitting, to the second base station when a target radio resource control (RRC) configuration is no longer valid, a second handover request message corresponding to the UE, the second handover request message including a second request for full configuration; and
    receiving, from the second base station, a second handover response message, the second handover response message including a second indicator of acceptance of the full configuration.

2. The method of claim 1, further comprising configuring the request for full configuration to include a request for an initial set of access stratum configuration parameters from the second base station.

3. The method of claim 1, further comprising transmitting the handover response message to the UE based on the handover response message including the indicator.

4. The method of claim 1, further comprising transmitting, to a third base station, a third handover request message corresponding to the UE, the third handover request message including a third request for full configuration.

5. The method of claim 1, wherein the handover request message is part of a conditional handover or a legacy handover.

6. The method of claim 1, wherein the target RRC configuration is no longer valid when a capability of the UE changes.

7. The method of claim 1, wherein the target RRC configuration is no longer valid when one or more security keys corresponding to a wireless network that includes the first base station and the second base station change.

8. The method of claim 1, further comprising transmitting the second handover response message to the UE based on the second handover response message including the second indicator.

9. The method of claim 1, wherein the handover response message includes a set of parameters corresponding to the full configuration, and wherein the set of parameters are included in a particular information element of the handover response message.

10. The method of claim 1, wherein the handover response message includes the indicator and an initial set of parameters corresponding to the full configuration, the initial set of parameters distinct from the indicator.

11. The method of claim 1, wherein the handover response message is configured to enable identification of the indicator independent of performing packet inspection of the handover response message.

12. An apparatus configured for wireless communication, the apparatus comprising:
    at least one processor; and
    a memory comprising instructions,
    wherein the at least one processor is configured to execute the instructions and cause the apparatus to:
        initiate transmission, to a second base station, of a handover request message corresponding to a user equipment (UE), the handover request message including a request for full configuration;
        obtain, from the second base station, a handover response message, the handover response message including an indicator of acceptance of the full configuration;
        initiate transmission, to the second base station when a target radio resource control (RRC) configuration is no longer valid, a second handover request message corresponding to the UE, the second handover request message including a second request for full configuration; and
        obtain, from the second base station, a second handover response message, the second handover response message including a second indicator of acceptance of the full configuration.

13. The apparatus of claim 12, further comprising a transmitter configured to transmit the handover request message and the second handover request message, wherein the apparatus is configured as a first base station.

14. The apparatus of claim 12, further comprising a receiver configured to receive the handover response message and the second handover response message, wherein the apparatus is configured as a first base station.

15. The apparatus of claim 12, wherein the at least one processor is configured to execute the instructions to further cause the apparatus to initiate transmission of the handover response message to the UE based on the handover response message including the indicator.

16. The apparatus of claim 12, wherein the request for full configuration corresponds to a flag included in the handover request message, and further wherein the indicator corresponds to a flag included in the handover response message or a particular information element included in the handover response message.

17. A method of wireless communication at a first base station, the method comprising:
    transmitting, to a second base station, a secondary node (SN) addition request message corresponding to a user equipment (UE) associated with the first base station, the SN addition request message including a request for full configuration;
    receiving, from the second base station, a SN addition response message, the SN addition response message including an indicator of acceptance of the full configuration;
    transmitting, to the second base station when a target radio resource control (RRC) configuration is no longer valid, a second SN addition request message corresponding to the UE, the second SN addition request message including a second request for full configuration; and
    receiving, from the second base station, a second SN addition response message, the second SN addition response message including a second indicator of acceptance of the full configuration.

18. The method of claim 17, further comprising transmitting the SN addition response message to the UE based on the SN addition response message including the indicator.

19. The method of claim 17, further comprising transmitting, to a third base station, a third SN addition request message corresponding to the UE, the third SN addition request message including a third request for full configuration.

20. The method of claim 17, wherein the SN addition request message is part of a conditional SN addition.

21. The method of claim 17, wherein the SN addition request message is part of a legacy SN addition.

22. The method of claim 17, wherein the target RRC configuration is no longer valid when a capability of the UE changes.

23. The method of claim 17, wherein the target RRC configuration is no longer valid when one or more security keys corresponding to a wireless network that includes the first base station and the second base station change.

24. The method of claim 17, further comprising transmitting the second SN addition response message to the UE based on the second SN addition response message including the second indicator.

25. The method of claim 17, wherein the request for full configuration corresponds to a flag included in the SN addition request message.

26. The method of claim 17, wherein the SN addition response message includes a set of parameters corresponding to the full configuration, and further wherein the indicator corresponds to a flag included in the SN addition response message or a particular information element included in the SN addition response message.

27. An apparatus configured for wireless communication, the apparatus comprising:
at least one processor; and
a memory comprising instructions,
wherein the at least one processor is configured to execute the instructions and cause the apparatus to:
initiate transmission, to a second base station, of a secondary node (SN) addition request message corresponding to a user equipment (UE), the SN addition request message including a request for full configuration;
obtain, from the second base station, a SN addition response message, the SN addition response message including an indicator of acceptance of the full configuration;
initiate transmission, to the second base station when a target radio resource control (RRC) configuration is no longer valid, a second SN addition request message corresponding to the UE, the second SN addition request message including a second request for full configuration; and
obtain, from the second base station, a second SN addition response message, the second SN addition response message including a second indicator of acceptance of the full configuration.

28. The apparatus of claim 27, further comprising a transmitter configured to transmit the SN addition request message and the second SN addition request message, wherein the apparatus is configured as a first base station that is configured to operate as a primary node (PN), and further wherein the second base station is configured to operate as a SN.

29. The apparatus of claim 27, wherein further comprising a receiver configured to receive the SN addition response message and the second SN addition response message, wherein the apparatus is configured as a first base station.

30. The apparatus of claim 27, wherein the at least one processor is configured to execute the instructions to further cause the apparatus to initiate transmission of the SN addition response message to the UE based on the SN addition response message including the indicator.

* * * * *